United States Patent [19]
Wilson et al.

[11] Patent Number: 5,467,152
[45] Date of Patent: Nov. 14, 1995

[54] OVERHEAD PROJECTOR

[76] Inventors: James S. Wilson, 3261 Eucalyptus Ave., Long Beach, Calif. 90806-1225; Zeno L. Charles-Marcel, 30 Fawn Dr., Shillington, Pa. 19607-9734

[21] Appl. No.: 234,916

[22] Filed: Apr. 28, 1994

[51] Int. Cl.$^6$ .............................. G03B 23/02; G03B 21/28
[52] U.S. Cl. ...................... 353/99; 353/103; 353/DIG. 3
[58] Field of Search .................... 353/103, 113, 353/119, DIG. 3, DIG. 5, DIG. 6, 98, 99, 63, 64, 81, 25

[56] References Cited

U.S. PATENT DOCUMENTS

| | | | |
|---|---|---|---|
| 3,110,217 | 11/1963 | Millner et al. | 353/DIG. 5 |
| 3,594,082 | 7/1971 | Loncher | 353/DIG. 5 |
| 4,133,605 | 1/1979 | Wiggin | 353/21 |
| 4,264,158 | 4/1981 | Lindqvist | 353/118 |
| 5,059,020 | 10/1991 | Géniéis | 353/DIG. 3 |

FOREIGN PATENT DOCUMENTS 0281225  12/1986  Japan ............... 353/DIG. 5

OTHER PUBLICATIONS

Publication "The 3rd Dimension—The Opaque Projector and Automatic Document Feeder", Paper Direct. Inc. Catalog. data unknown. p. 53.

*Primary Examiner*—William C. Dowling
*Attorney, Agent, or Firm*—Knobbe, Martens, Olson & Bear

[57] ABSTRACT

An improved overhead projector which allows for automated feeding of transparencies from input and output trays positioned within a body of the projector. The feed mechanism is reversible to allow previously viewed transparencies to be repositioned over a light source on a table of the projector and seen on a display screen. The transparency trays include retractable mechanisms allowing them to be switched from receiving or delivering transparencies into a feed path. An optical projection head includes an adjustable mechanism to automatically reorient a projected image for transparencies in landscape or portrait views. The adjustable mechanism includes a first mirror which is adjustable to reflect light transmitted from the light source directly from the transparency toward the display screen, or to present a thin vertical profile allowing a light image to reflect off second and third mirrors before reflecting again off the first mirror and toward the display screen. The entire feed and reorientation assemblies can be remotely controllable via a hand-held device and control system.

21 Claims, 7 Drawing Sheets

OVERHEAD PROJECTOR

FIELD OF THE INVENTION

The present invention relates generally to overhead projectors and, more particularly, to an overhead projector system that automatically handles transparencies and projects an upright image of transparencies oriented in both landscape and portrait views.

DESCRIPTION OF THE RELATED ART

Conventional overhead projectors utilize a light source to illuminate a transparency having opaque characters or drawings thereon. The illuminated image transmitted through the transparency is then projected via one or more lenses to a projector screen. Typically, the projector consists of a base having a table on which the transparencies are placed, the light source being underneath the table. The light is transmitted upwardly to a projection head, within which the lenses and one or more mirrors are mounted. In the simplest version, a single mirror is oriented at 45 degrees to redirect the light being transmitted vertically upward in a horizontal direction toward the projection screen.

When using conventional overhead projectors, an operator must manually place each transparency on the table and orient it properly to reflect an upright image on the projection screen. As anyone who has operated such a projector knows, the movement of the transparencies on the table is contradictory to the movement seen on the projection screen. Moreover, in addition to having to frame the transparencies over the light source, the operator regularly has to deal with both landscape and portrait views. Typically, when using standard 8½×11 inch transparencies, a landscape view is one in which the information is upright when the rectangular transparency is held with its longer dimension horizontal, while a portrait view is one in which the information is upright when the transparency is held with its longer dimension vertical. A long sequence of transparencies accumulated for a presentation often has written description mixed in with graphs and other pictorial information, which may or may not all be in the same view, either landscape or portrait. A further drawback with the operation of conventional overhead projectors is the difficulty involved in returning to a previously viewed transparency. In this case the operator must rifle through the already-viewed transparencies and reposition the desired one on the table. If the presentation is to be repeated in a short time and the number of transparencies is great, the job of resorting and reorienting the stack of transparencies can be quite significant.

Automated slide projectors, on the other hand, have been available for years. In these devices, a plurality of slides is inserted into a cartridge in a predetermined order and the cartridge placed within the slide projector. The cartridge can then be repositioned and slides removed from the cartridge to a projection location. The slides are usually viewed sequentially, but any one slide can be repeated by simply reversing the direction of the cartridge. Although automated slide projectors are quite convenient for presentations, producing the slides is an expensive and somewhat time-consuming process. On the other hand, modern copiers and laser printers can imprint an image on transparencies with ease, thus making transparencies the presentation medium of choice.

U.S. Pat. No. 4,264,158 discloses a picture changer for an overhead projector. In this apparatus, a vertically adjustable magazine stores a number of picture plates, within which pictures are held. The magazine can be adjusted to place a particular picture plate adjacent a projector table. A mechanism engages the picture plates from the magazine and places them on the table, and vice versa. To use this device, one must position the pictures within the picture plates and the plates within the magazine prior to operation. Although any one picture plate can be accessed in any order, the mechanism for accomplishing this is relatively cumbersome. Furthermore, it is somewhat inconvenient to have to orient the pictures within the picture plates prior to operation. In addition, the provision of the picture plates raises the cost and weight of the entire assembly. Finally, an operator cannot readily place a picture into the projector device without first mounting it within the picture plate.

Consequently, there is presently a need for an improved overhead projector system that requires less manual manipulation during operation.

SUMMARY OF THE INVENTION

In accordance with the present invention, an apparatus for viewing transparencies is provided which incorporates a transparency feed mechanism and has a novel optical image changing system capable of reorienting a projected image without moving the transparency. In general, the apparatus includes a main body defining a projection location on a table, an upstanding head support attached to the side of the body and a projection optics head supported by the head support above the table. A light source within either the body or the head illuminates transparencies at the projection location, the illuminated image being redirected via the head toward a displaced screen. The head includes a plurality of lenses and mirrors for directly reflecting the illuminated image or reorienting it prior to projecting it onto the display screen.

The projection optics head preferably comprises a housing defining a first aperture positioned relative to the body to receive the illuminated image from the transparency and a second aperture facing the display screen. The head further includes a first lens mounted within the first aperture, a first mirror pivotably mounted above the first lens, a second mirror mounted above the first mirror and angled downward into one side and a third mirror mounted to one side of the first mirror and angled upward toward the second mirror. A mechanism is provided for moving the first mirror from the first position to a second position. In the first position, an illuminated image passing through the first lens is reflected by the first mirror through the second aperture and toward the display screen. In the second position, the illuminated image passes around the first mirror to be reflected by the second mirror onto the third mirror which subsequently reflects the image against the first mirror and thereafter toward the display screen through the second aperture.

To be more succinct, when the first mirror is in its first position, the overhead projection system functions similar to a conventional overhead projector, in that the illuminated image is reflected just once off of the first mirror within the projection head toward to the display screen. When the first mirror is in its second position, however, the optical path of the illuminated image is greater as it bounces off the second and third mirrors before being reflected off the first mirror to the display screen. In accordance with once aspect of the present invention, a second lens mounted within the housing above the first mirror compensates for any difference in distance the image travels within the head when the first mirror is in its second position. The provision of the second lens thus eliminates the need to refocus the image when moving the first mirror from the first position to the second position.

The first mirror, in its first position, forms approximately 45° angle with the horizontal to reflect an illuminated image from the projection location below to a display screen horizontally forward from the head. When the first mirror is repositioned it lies in a substantially vertical plane, the plane making an approximately 45° angle with a line from the projection head to the display screen. One means for repositioning the first mirror is to pivotably mount the mirror on a diagonal shaft. The shaft lies along an axis which is disposed 45° from a vertical line as well as 45° from a horizontal line from the head to the display screen, as the axis must lie within the plane of the first mirror at all times. An actuating device such as a step motor or solenoid may be provided to reorient the first mirror about the axis. Alternatively, a simply spring loaded arrangement in combination with an electromagnet may be used. Although a pivoting arrangement for the first mirror is preferred, it is contemplated that the adjustment between the first position and the second position may be accomplished by translating the first mirror.

In accordance with a further aspect of the present invention, the apparatus body is provided with an input tray and an output tray, both sized and shaped to hold transparencies. A feeder defines a feed path from the input tray to the projection location and from the projection location to the output tray. The feeder may comprise a plurality of engagement members or rollers arranged along the feed path so as to frictionally engage the transparencies being transported along the feed path. A drive system selectively actuates the rollers so that transparencies are moved along the feed path from the input tray to the projection location and from the projection location to the output tray. A control unit communicates with the feeder to orchestrate the movement of transparencies. The drive system is also capable of reversing and moving transparencies along the feed path from the output tray to the projection location and from the projection location to the input tray. In a further embodiment, a manual override tray is provided wherein the feeder is capable of transporting transparencies from the override tray to the projection location and vice versa.

In one version of the present invention, the body is a relatively substantial unit housing a light source underneath a Fresnel lens under the table to define the projection location. In this version, the input and output trays are housed within the body and thus a feed path is defined completely within the body. A manual override tray may be positioned at one side of the body to be in a position to selectively insert transparencies between a predetermined sequence of transparencies stacked in the input tray. A vertically adjustable curvilinear guide member is provided, much like a train track switching apparatus, to allow transparencies to pass between the projection location and the manual override tray.

In a tabletop version of the present invention, the light source is part of the projection head to be beamed downward and reflected off a Fresnel mirror underneath the transparencies at the projection location. The illuminated image is reflected off the mirror upward into the projection head whereupon it may be reoriented and then directed toward the display screen. In the tabletop version, the body is substantially less bulky than in the former version and the input tray is mounted to front corner of the body at the level of the table and the output tray below the level of the body. This version is substantially lighter than the standalone version.

These features and others will be apparent from the following description and drawings.

DESCRIPTION OF THE PREFERRED EMBODIMENTS

Figure 1:
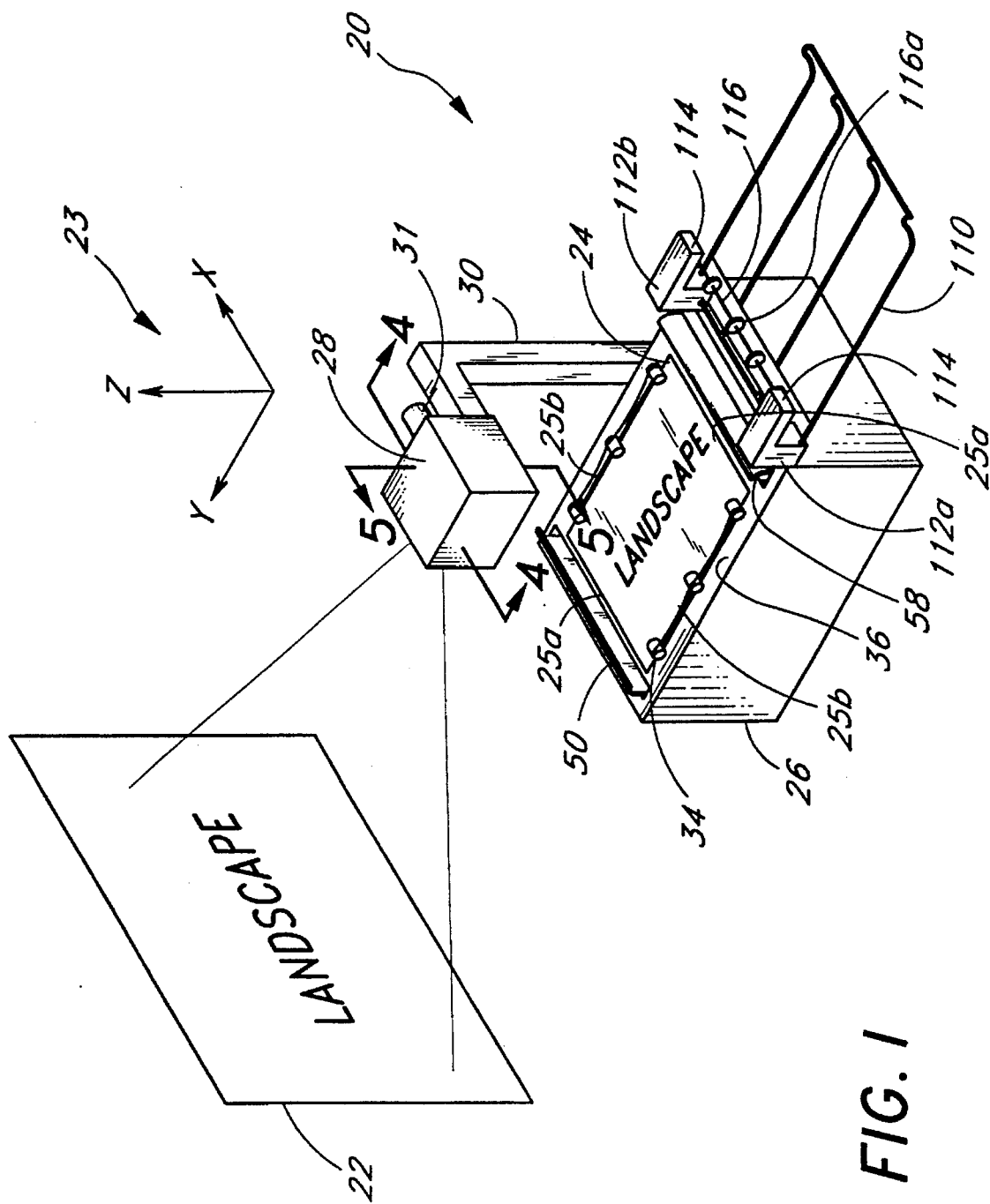
FIG. 1 is a perspective view showing a preferred embodiment of an overhead projector of the present invention.

Turning now to the drawings, and in particular to FIGS. 1–5 thereof, there is shown a preferred embodiment of an overhead projection system constructed in accordance with the present invention and indicated generally by the reference numeral 20. The overhead projection system 20 is shown in FIG. 1 projecting an image upon a projection screen 22. The projection screen may be any surface, preferably vertical, such as a wall, for instance. For purposes of this description, a frame of reference 23 having three orthogonal axes is defined by a vertical Z-axis, a horizontal X-axis extending from left to right when looking at the projection screen 22, and a horizontal Y-axis extending from the overhead projection system to the screen.

One of the main inventive features in the present invention is illustrated in FIG. 1, wherein a transparency 24 has the word "landscape" printed thereon and the image has been reoriented and projected as an upright image on the screen 22. More particularly, the transparency 24 is positioned in a plane parallel to the X-Y plane at a projection location and its image is projected along a line parallel to the vertical Z-axis and then redirected along a line parallel to the horizontal Y-axis to the screen 22 which lies in a plane parallel to the X-Z plane. The characters on the transparency 24 initially are read along a line parallel to the Y-axis and have been re-oriented to be read along a line parallel to the X-axis. By way of definition, the ends 25a of the transparency are those edges parallel to the X-axis opposing each other along the Y-axis, while the sides 25b of the transparency are those edges parallel to the Y-axis and opposing each other along the X-axis.

Transparencies typically are rectangular cellulose sheets having a narrow dimension and a long dimension. These sheets may come in various sizes, such as, for example, 8½×11 inches, A4 or mini transparencies. For these particular sizes, a landscape view is that when the image on the projection screen appears with the long dimension is horizontal. In a more general sense, and for this discussion, a landscape view has characters printed so as to be read from one end 25a to the other, as depicted in FIG. 1, while a portrait view has characters printed so as to be read from one side 25b to the other; the ends and sides being previously defined with respect to the frame of reference 23.

The major components of the overhead projector system 20 are as follows: a projector body 26 comprising a generally box-shaped unit from. which all other components are supported; a projection optics head 28 at the end of a head support 30 rigidly or pivotably attached to one side of the body; a focus mechanism represented by knob 31; and a transparency changer mechanism 32, of which only several transparency engagement members 34 positioned on a table 36 are visible in FIG. 1.

Feeder

Figure 2:
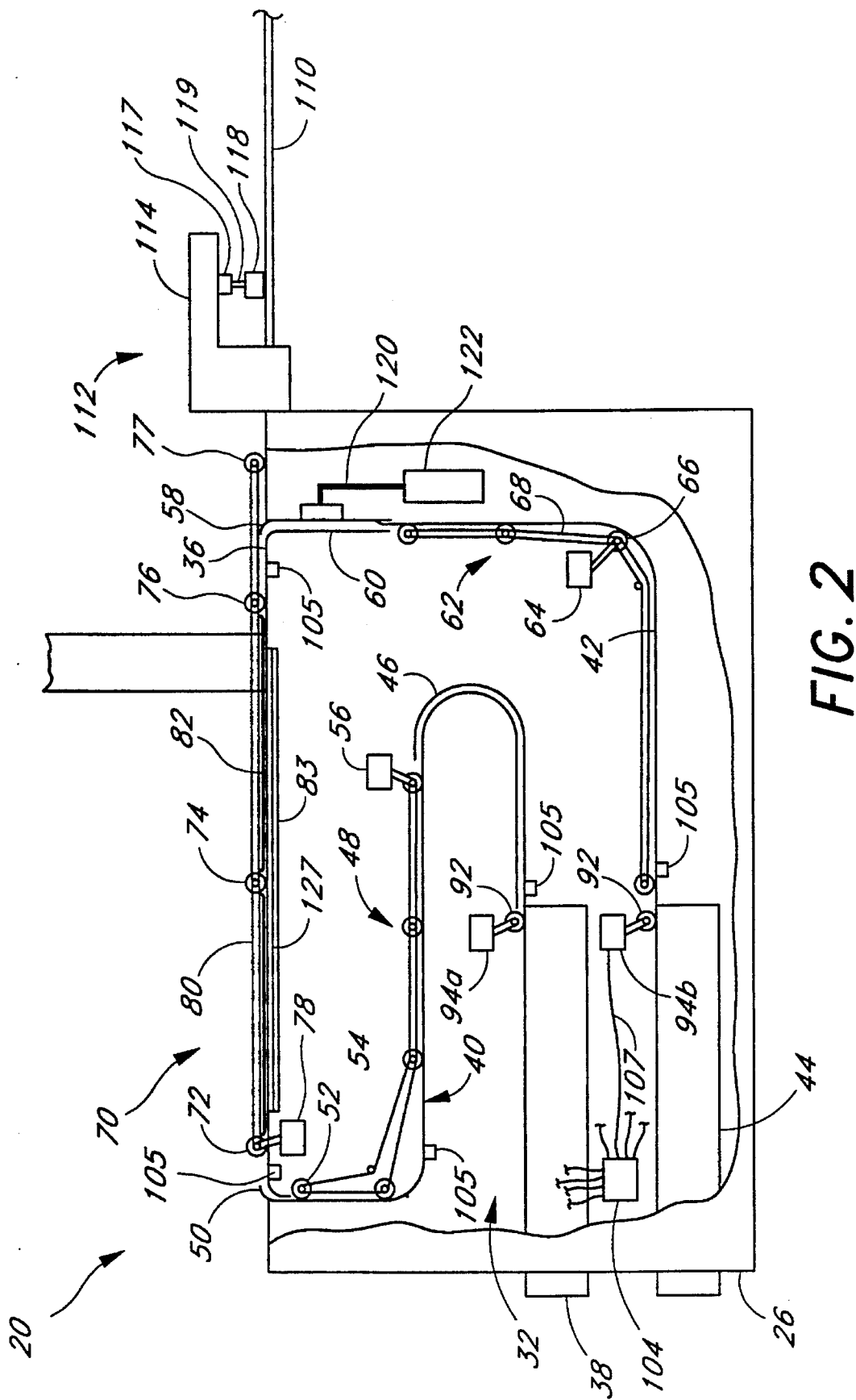
FIG. 2 is a schematic partial sectional view of the projector body and internal feed mechanism of the overhead projector of FIG. 1.
Figure 3:
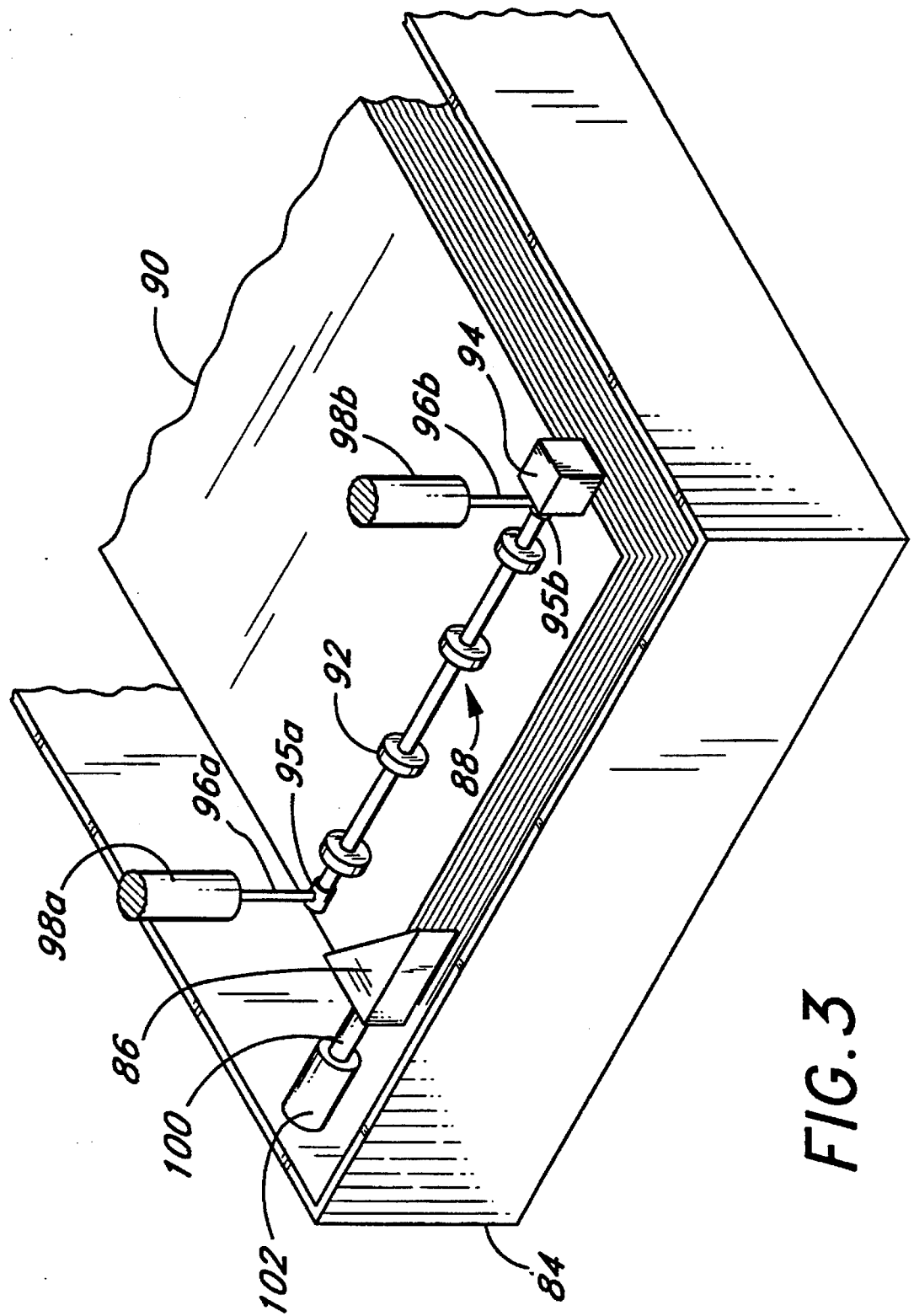
FIG. 3 is a partial perspective view of a preferred input/output transparency tray.

Now, with further reference to FIGS. 1–3, the transparency changer mechanism or feeder 32 generally provides an automated apparatus for transporting transparencies to and from a projection location along a feed path. The feed path generally extends between a first tray 38 along a first delivery line 40, over the table 36 (which defines the projection location) to a second delivery line 42 to a second tray 44. As will be described below, both the first tray 38 and the second tray 44 can function as inputs and outputs to the feed path. These trays 38, 44 are removably mounted within the Body 26 and project an outer end from exterior of the body to facilitate removal for inserting or taking out stacks of transparencies.

The first delivery line 40 comprises a plurality of transparency guides 46 and a first feed mechanism 48. The guides 46 direct the transparencies along the delivery line 40 from the first tray 38 to a curvilinear guide member 50 projecting above the table 36, and vice versa. The first feed mechanism 48 generally comprises a plurality of engagement members or rollers 52 journalled to the body 26 at fixed locations and rotatably coupled by a belt 54. The rollers 52 are preferably arrayed along shafts extending across the width of transparencies. These rollers are arrayed on the shaft and positioned to frictionally engage the transparencies against the transparency guide 46. Accordingly, the rollers 52 are preferably constructed of an elastomeric material.

A small drive motor 56 provides rotational movement to one of the rollers 52, and thus to the entire line of rollers within the first feed mechanism 48. Such a belt and roller feed mechanism is well known in the art is commonly used within laser printers and desirably incorporates a chain or ribbed belt to avoid slippage. The drive motor 56 is reversible so that transparencies can be propelled in either direction along the first delivery line 40.

The second delivery line 42 extends between the second transparency tray 44 and a movable curvilinear guide 58 shown in a raised position projected above the surface of the table 36. The second delivery line 42 also incorporates a number of guide members 60 and a second feed mechanism 62. The second feed mechanism 62 is similar to the first feed mechanism 48 and includes a drive motor 64 rotatably driving one roller in a series of rollers 66 journalled at fixed locations within the body 26 and coupled by a belt 68. Again, the drive motor 64 is reversible to propel transparencies in either direction along the second delivery line 42.

A table feed mechanism 70 propels transparencies from the curvilinear guide member 50 to the movable curved guide member 58. In this respect, as transparencies exit the first delivery line 40, first engagement members or rollers 72 on either side of the transparency 24 (as shown in FIG. 1) grip the edges of the transparency and propel it to the right (as illustrated in FIG. 2). A second pair of rollers 74 then engages the transparency, and finally, a pen ultimate set of rollers 76 grips and propels the transparency. This order is for transparencies passing from left to right in FIG. 2 and would be reversed if the transparencies were moving in the opposite direction. FIG. 2 also shows an ultimate roller 77 coupled with the table feed mechanism 70 and positioned to the right of the curvilinear guide 58. The ultimate roller 77 will be used if an operator chooses to actuate a manual override tray, which will be described below. In this view, the movable guide 58 is shown in an up position, which corresponds to a first feed path from the first tray 38 to the second tray 44, or vice versa. With the movable guide 58 raised up, transparencies are diverted before reaching the ultimate roller 77. The table feed mechanism 70 additionally comprises a drive motor 78 and a continuous belt or chain 80 rotatably coupling the rollers 72, 74, and 76, which are journalled at fixed locations with respect to the body 26.

In order to maintain the lateral edges of the transparencies flat with respect to the table 36, a series of hold-down strips 82 are mounted between the rollers 72, 74, and 76. The hold-down strips 82 preferably comprise thin, elongated plastic members, which are biased toward the table 36 and include upturned ends to prevent catching the leading edges of the moving transparencies. The strips 82 are desirably mounted in a manner to lightly press down on the edges of the transparencies 24 as they traverse the table 36. As seen from FIG. 1, the lateral projection of the rollers 72, 74, and 76 and hold-down strips 82 is minimized to prevent blocking the illuminated image of the transparency. In order to illuminate a transparency on the table 36, the projector 20 is provided with a light source 83 underneath the projection head 28 which selectively illuminates the projection location.

The electrical circuitry of the respective motors within the feed path is desirably networked at a control unit 104, which also selectively distributes power to the motors. The circuitry is schematically shown by the sample lead 107 between the control unit 104 and motor 94b and by a plurality of abbreviated leads extending from the control unit intended to suggest communication with all the remaining electrically activated components. The control unit 104 preferably also includes a microprocessor to enable decisions to be made based on various inputs from sensors 105 placed around the feed path, as is well known in the art. Such sensors, although not shown, might include physical trip sensors, optical sensors, ultrasonic sensors, motor feedback, or other such devices. Thus, for example, if a transparency is to be delivered from the first tray 38 to the table 36, the drive motor 64 of the second delivery line 42 need not be actuated. Likewise, if the aforementioned transparency is to be returned to the first tray 38 from the table 36, the drive motor 64 remains inactive, while the drive motors 56 and 78 are propelled in the opposite direction, and the roller shaft 88 and clip 86 of the first tray 38 retract. Such feedback and control mechanisms are well known in the art, and thus will not be described further herein.

Input/Output Transparency Trays

Now, with specific reference to FIG. 3, a versatile transparency tray, such as first tray 38 or second tray 44, is shown. The tray is defined by a transparency receptacle 84, sized and shaped to receive a particular dimension transparency, or having an adjustable receiving mechanism (not shown) installed within. Such adjustable size trays are commonly used in standard printing or copying machines and will thus not be further elaborated on herein. Although there are several ways to remove a single sheet from a stack of sheets disposed within the receptacle 84, one means comprises a combined corner clip 86 and roller shaft 88 apparatus. The stack 90 of transparencies is desirably spring-biased upward from base of the receptacle 84 toward the clip 86, which fits over one corner of the stack.

The roller shaft apparatus 88 includes a plurality of engagement members or rollers 92 made of an elastomeric or other material having a relatively high coefficient of friction, a drive motor 94 at one end of the shaft, and a pair of journal caps 95a, 95b supported by pistons 96a, 96b extending from cylinders 98a, 98b. The pistons 96 reciprocate within the cylinders 98, which are fixedly attached to a structural portion of the body 26 (not shown). In this regard, the roller shaft assembly 88 is not literally a part of the trays 38 or 44, but constitutes an important cooperating member in the transparency feed path at the interface between the delivery lines 40, 42 and the trays 38, 44. Moreover, although it is most convenient to mount the roller shaft 88 via the cylinders 98 to the structure of the body 26, the cylinders could also be mounted to an appendage of the tray and literally be a part of the tray. However, as the trays 38, 44 are preferably removable, as in conventional copying and printing devices, the roller shaft apparatus 88 is desirably connected to the body 26.

The corner clip 86 is mounted on the end of a piston 100, which reciprocates in a cylinder 102 mounted to one side wall of the tray receptacle 84. The piston and cylinder arrangement allows for retraction of the corner clip 86 from contact with the stack of transparencies 90. In order to function as an "input tray," that is, to supply transparencies to one of the delivery lines 40, 42, the assembly is in the position shown in FIG. 3 with the clip 86 engaging the corner of the stack of transparencies. The roller shaft 88 is in a down position, with the pistons 96a, 96b fully extended from the cylinders 98a, 98b. The assembly is such that the resilient rollers 92 press down lightly on a top transparency in the stack 90. As the motor 94 rotates to turn the shaft 88 in a clockwise direction looking from the motor end, the rollers 92 urge the top transparency against the clip 86. As the transparency is further urged towards the clip 86, a zone of the top transparency proximate the clip begins bending or buckling outward until the corner, which was previously suppressed under the clip, springs out, and the top transparency is propelled off the end of the tray receptacle 84. With reference to FIG. 2, the motors 94 and rollers 92 are positioned to propel the top transparency sheet onto either the first delivery line 40 from the first tray 38 or onto the second delivery line 42 from the second tray 44. Thus, either of the trays 38, 44 can function as an "input tray."

In order to receive transparencies, the clip 86 is retracted transversely via the piston 100 sliding into the cylinder 102, while the roller shaft 88 remains horizontal and is raised upwardly by retraction of the pistons 96 into the cylinders 98. Transparencies traveling along either of the delivery lines 40, 42 may then be propelled into the tray receptacle 84 of the first tray 38 or second tray 44, respectively. In most cases, one tray will be dedicated as an "input tray," while the other functions as an "output tray." A stack of transparencies 90 is thus loaded into the input tray and inserted within the body 26 to be fed through the feed path, ultimately to end up in the output tray. Such a feed path might conceivably begin at the first tray 38 and continue along the first delivery line 40, across the table 36, along the second delivery line 42, and terminate at the second tray 44.

Manual Override Tray

Reference is now made again to FIGS. 1 and 2. In order to allow for spontaneous addition or retraction of transparencies from a sequence, a manual override tray 110 is attached fixedly to one side of the overhead projector body 26. Although the ability to insert and retract individual transparencies randomly in a sequence is extremely advantageous, the manual override tray 110 is an additional feature not considered essential to the primary automatic feed mechanism described above. The body of the manual override tray 110 has a relatively lightweight construction in comparison to the first and second trays 38 and 44, and mounts adjacent to a pair of roller supports 112a, 112b extending from a rear corner of the projector body 26. The roller supports 112a,b include overhanging portions 114 from which a retractable roller shaft 116 having drive wheels 116a depends.

The roller shaft 116 is adjustable between a retracted position and a transparency engaged position via cylinders 117, pistons 119 and drive motors 118, much like the arrangement of the roller shaft 88 and motor 94 shown in FIG. 3. In this respect, the retractable roller shaft 116 functions in an identical manner as the equivalent elements shown in FIG. 3 to enable transparencies to be propelled from or deposited in the tray 110. Typically, however, the manual override tray 110 is useful for selectively inserting one transparency at a time into a series of transparencies traveling between the trays 38 and 44. For this relatively simple mode of operation, the roller shaft 116 may be positioned at a fixed height so as to engage the inserted transparency for propelling it forward onto the table 36 or back into the tray 110. In this configuration, there would be no need for the cylinder 117 and piston 119 mounting arrangement.

As mentioned previously, the movable guide 58 is normally in the upward position preventing transparencies from continuing toward the manual override tray 110. The movable guide 58 is attached via a piston 120 to a cylinder 122 mounted within the projector body 26. Retraction of the piston 120 into the cylinder 122 lowers the movable guide 58 below the level of the table 36 and allows transparencies to pass across the gap formed at the top of the second delivery line 42. With the guide 58 lowered, transparencies can be delivered from the override tray 110 via the roller shaft 116 to be grabbed by the ultimate roller 77 and propelled to the projection location. The same transparency can then be returned to the manual override tray 110 by actuating the motor 78 in a reverse direction or to the output tray by raising the movable guide 58 and actuating the motor in the reverse direction. The ultimate roller 77 is thus utilized to propel the transparency back into the tray 110, or into engagement with the roller shaft 116.

Optical Projection Head

Figure 4:
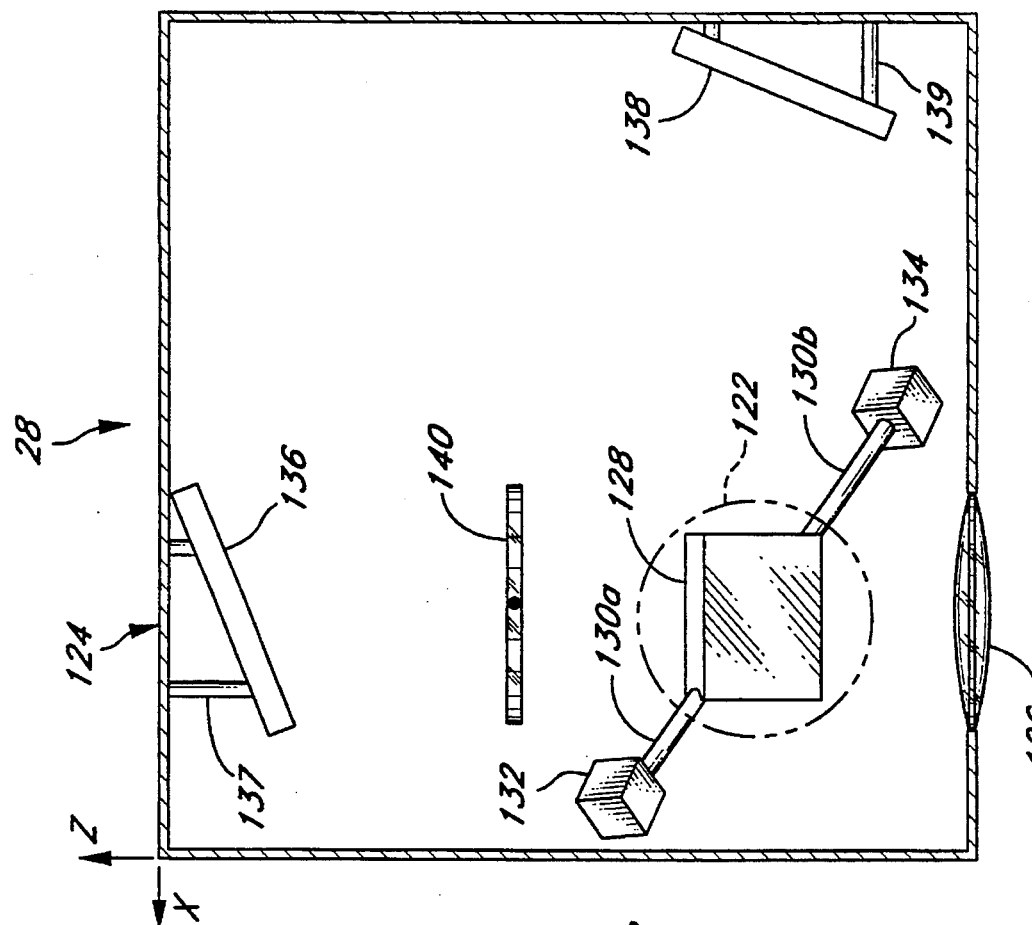
FIG. 4 is a schematic cross-sectional view of a projection head taken along line 4—4 of FIG. 1.
Figure 5:
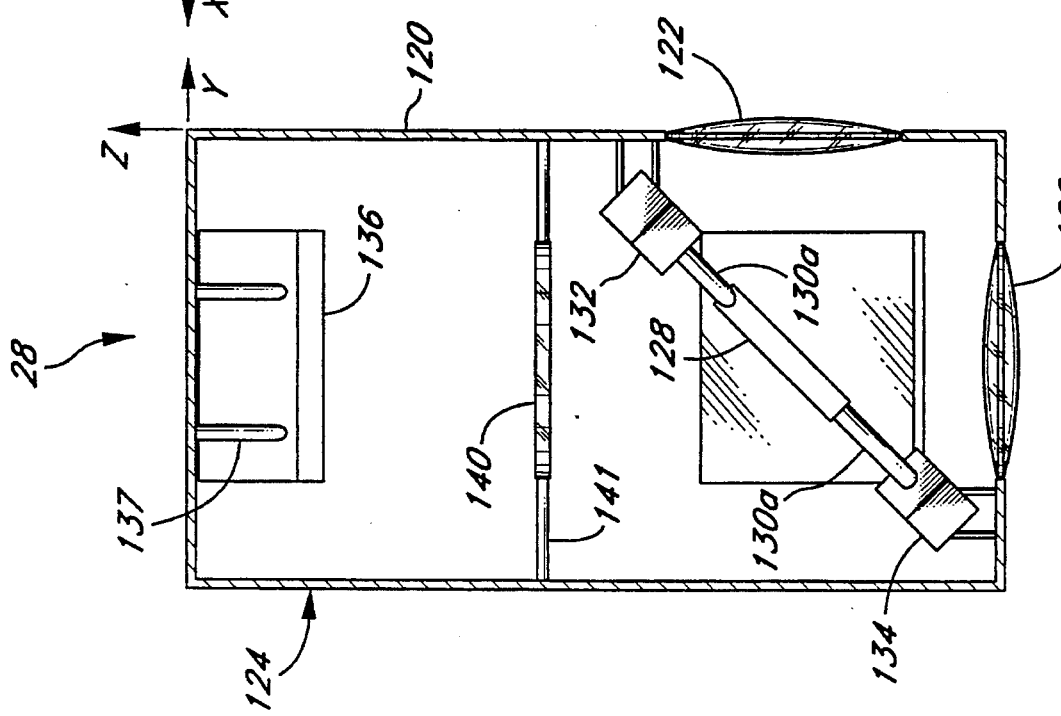
FIG. 5 is a schematic cross-sectional view of the projection head taken along line 5—5 of FIG. 1.

Now referring to FIGS. 4 and 5, the components within the projection optics head 28 are shown. FIG. 4 shows the interior of the head 28 with a front wall 120 containing a projection lens 122 removed. The wall 120 forms part of a box-shaped housing 124 which provides support for the elements described below. A first lens 126 on the lower wall of the housing 124 faces the table 36 and receives illuminated light images transmitted upward from the light source 83 through the transparencies. A Fresnel lens 127 is disposed between the light source 83 and the transparencies to focus the image onto the lower lens 126.

Just above the lower lens 126, a first mirror 128 has a pair of shafts 130a, 130b defining a shaft axis in the plane of the mirror. The upper shaft 130a is journalled about an upper support 132 rigidly supported by the housing 124. On the other end, a rotational actuation mechanism 134 internally keyed to the lower shaft 130b is also rigidly mounted within the housing 124. The first mirror 128 rotates about the axis so as to assume two positions diagonally disposed within the head 28. In a first position, shown in FIGS. 4 and 5, the plane of the mirror 128 is disposed in a plane at a 45° angle relative to the X-Z plane as rotated from the positive Z-axis toward the positive Y-axis. In a second position, shown in FIG. 7, the mirror 128 is disposed in a plane at a 45° angle relative to the X-Z plane as rotated from the positive X-axis toward the positive Y-axis.

A second mirror 136 is fixed to the housing 124 by struts 137 or other suitable supports directly above the first mirror 128 and lower lens 126. The second mirror 136, as shown in FIG. 4, is angled downward and to one side of the housing toward a third mirror 138. The third mirror 138 is attached to the housing 124 by struts 139 at a slight upward angle toward the second mirror 136. A corrective lens 140 is fixedly mounted within the housing 124 via struts 141 between the first mirror 128 and second mirror 136.

Figure 6:
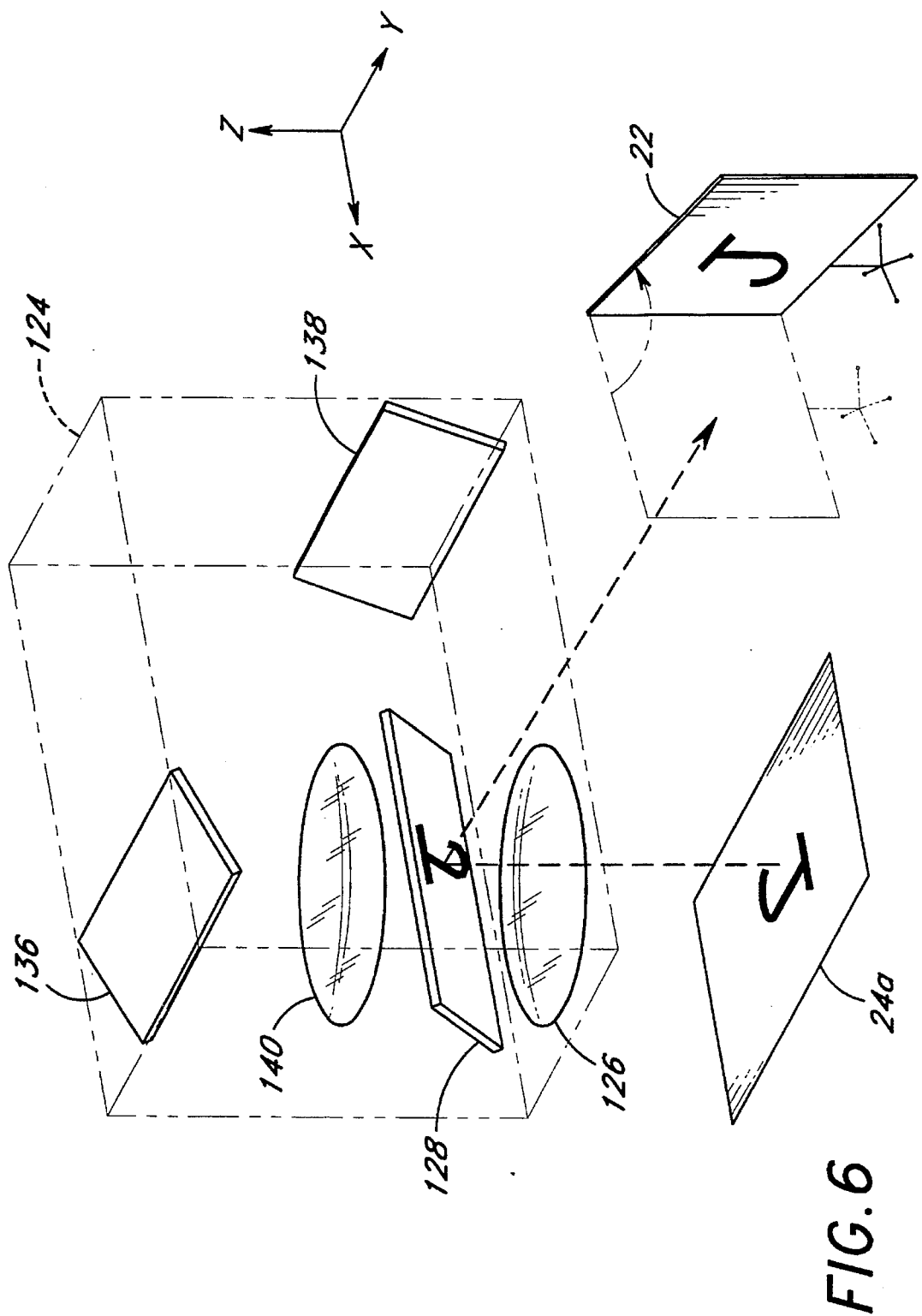
FIG. 6 is a schematic representation of the optical components within the projection head and the desired optical path from a transparency oriented in a portrait view to a screen.

In the position shown in FIGS. 4 and 5, the first mirror 128 will reflect light passing through the lower lens 126 90° outward through the front lens 122. This optical path is identical to conventional overhead projectors, wherein the image reflects off one mirror to a viewing screen 22. FIG. 6 more clearly shows this single reflection of an image from a transparency 24 off of the first mirror 128 to a projection screen 22. The projection screen 22 is shown rotated and the image of the letter J appears as it would looking from the lens 122 to the screen in an unrotated position. The transparency 24a has characters printed on it in a portrait orientation, that is, the characters can be read from one side 25b to the other, as defined above.

Figure 7:
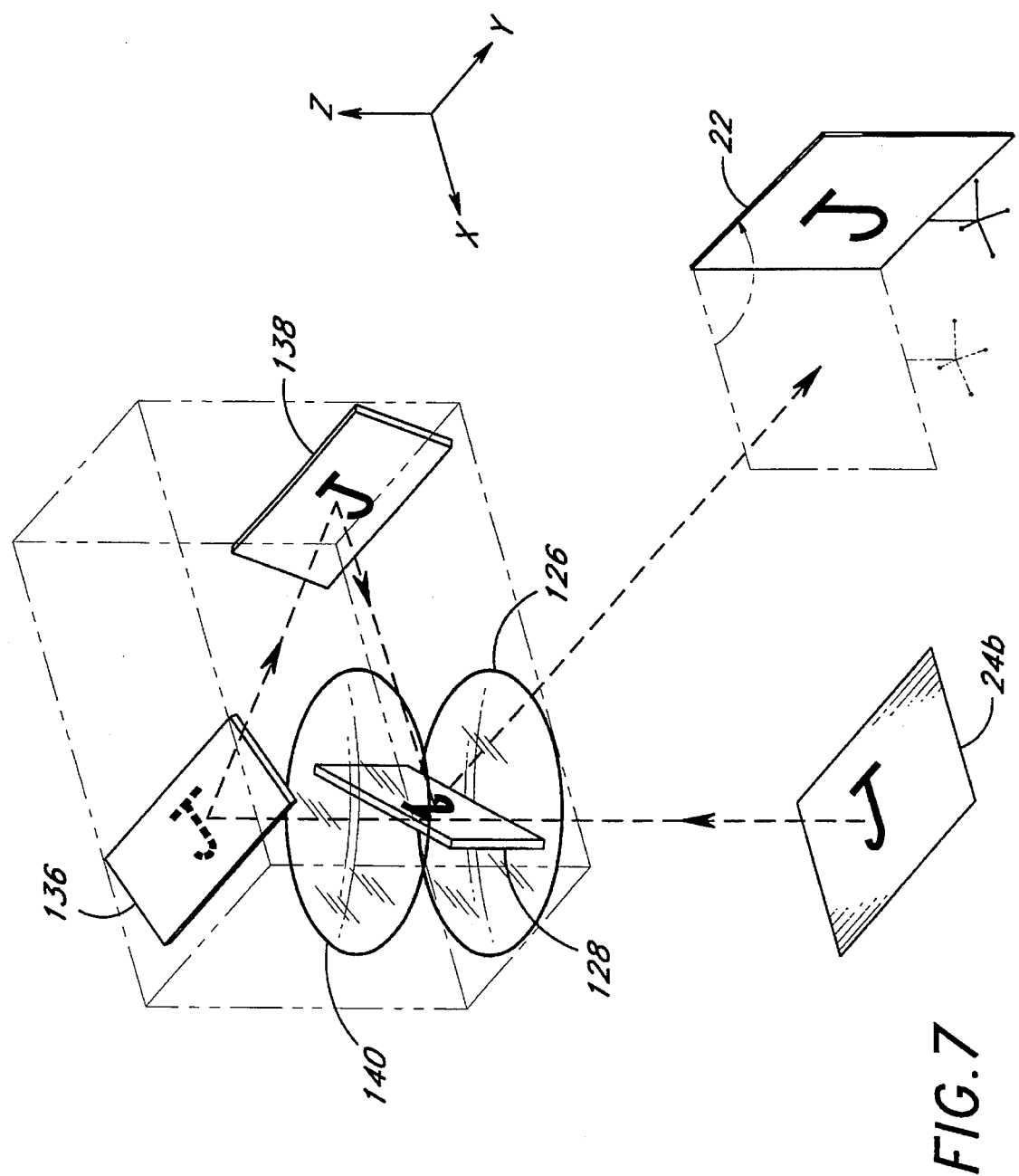
FIG. 7 is a schematic representation of the optical components within the projection head and the desired optical path from a transparency oriented in a landscape view to a screen.

If, however, as shown in FIG. 7, a transparency 24b includes characters written in a landscape orientation, as is the letter J, the aforementioned mirror configuration of FIG. 6 will not reflect an upright image on the screen. Instead, the letter J would reflect sideways. In order to accommodate for landscape orientation transparencies, the present invention provides an adjustment mechanism to redirect the optical path and reorient the projected image.

Specifically, as seen in FIG. 7, the first mirror 128 has been pivoted about the shaft 130 axis with only a thin vertical projection along one edge so that the light transmitted upward from the light source through the lower lens 126 passes therearound and continues upward with a small associated loss in intensity. The letter J can be seen reflecting off of the second mirror 136 and downward and to the right toward the third mirror 138. This schematic depiction is intended to allow the reader to follow the changing orientation of the character J as it bounces off the respective mirrors. After reflecting off the third mirror 138, the image reflects off the first mirror 128 and is redirected toward the viewing screen 22. At this point, the image of the letter J has been reoriented vertically to be readable on the screen 22.

Adjustable Optical Path

In order to more fully understand the angles involved in this secondary optical path, the reader is directed to FIG. 4. In this illustration, it can be seen that the second mirror 136 is oriented at a 22½° angle downward and to the right, while the third mirror 138 is oriented at a 22½° angle upward and to the left. Light travelling up through the lower lens 126 and then through the compensating lens 140 strikes the second mirror 136 and is reflected downward at a 45° angle due to the additive nature of a reflected light path. Likewise, the image strikes the third mirror 138 at a 45° angle from the horizontal and is reflected directly horizontally to the left because of the specific angle at which the mirror is mounted. Finally, the image is reflected at a 90° angle off the first mirror 128 toward the screen 22. Although three mirrors are utilized in the preferred embodiment of the present invention, more than three are possible. However, there should be an odd number of mirrors to maintain the proper orientation of the projected image. Furthermore, the angles at which the mirrors are placed within the housing 24 should be adjusted based on the total number included.

The provision of the optical path correction lens 140 is important, as the image must travel a longer distance when being reoriented via the three mirrors. The lens 140 is desirably a concave lens to adjust the focal point of the image to avoid constant focusing of the overhead projector when changing from portrait to landscape or vice versa. Normally, the focus knob 31 must be re-adjusted when the optical path is changed, such as when the projector is moved toward or away from the screen 22.

With respect to the focussing mechanism 31, conventional projectors utilize a simple rack and pinion system for raising and lowering the head 28 with respect to the projection location. The knob 31 could be replaced by an motorized or other electronically actuated mechanism controlled by a user, or one controlled automatically, based on input from strategic distance sensors (for example, infra-red sensors) mounted on the head 28. Lens 140 can be omitted on models of the projector that automatically focus. Additionally, lens 122 as shown in FIG. 5 can be replaced by other lenses e.g. telephoto or zoom lens. This allows placement of the projection further from the screen than is currently available.

The rotational actuation mechanism 134 depicted schematically in FIGS. 4 and 5 may take a number of forms depending on the sophistication of the finished product. For example, the actuation mechanism 134 may be a simple coil spring biasing the first mirror 128 into either a first position, shown in FIGS. 4 and 5, or into a second position shown in FIG. 7. A small fixed electromagnetic and corresponding attraction structure fixed to the rotating shaft 130 may be provided to change the position of the first mirror 128. In this case, a current supplied to the electromagnetic would change the mirror position from its spring biased normal state. In another scenario, the actuation mechanism 134 may comprise an electronically actuated solenoid or,motor which automatically changes the position of the first mirror 128 upon the appropriate signal. One of skill in the art will appreciate that the final design for the actuation mechanism 134 does not comprise an inventive leap but rather represents a design choice based on engineering and costs constraints.

The shaft 130 is shown having a specific axis to enable the first mirror 128 to rotate approximately 45° from the first position to the second position. The shaft 130 has an axis which makes a 45° angle with the X-Z plane and a 45° angle with the Y-Z plane, as best seen in FIGS. 4 and 5. This particular orientation of the shaft 130 allows the first mirror 128 to lie in a plane in its first position which makes a 45° angle relative to the X-Z plane as rotated from the positive Z-axis toward the positive Y-axis. In the second position, however, the first mirror 128 lies in a vertical plane at a 45° angle relative to the X-Z plane as rotated from the positive X-axis toward the positive Y-axis. The shaft 130 thus remains in the plane of the mirror 128. Rotating the first mirror 128 about an axis is undoubtedly the simplest means for redirecting the optical path through the head 28. It is also contemplated, however, to accomplish the functional equivalent of the first mirror 128 by using two separate mirrors in fixed orientations which translate into and out of the optical path. Although such a mechanism is not shown herein for reasons of economy, it is considered an equivalent structure to the rotating first mirror 128.

As mentioned, for the longer optical path of FIG. 7, light images transmitted upward from the light source 83 through the transparencies pass around the first vertically oriented mirror 128 with a subsequent reduction in intensity. The image thus projected on the screen will appear dimmer than a projected image from the more direct path of FIG. 6. In order to compensate for this visual difference, the light source 83 may be dimmed by, for example, reducing the input voltage, thereto when the optical path of FIG. 6 is utilized. Alternatively, the intensity of the light source 83 may be increased for the optical path of FIG. 7. The voltage adjustment is preferably accomplished automatically via the control unit 104 sending a signal to a light source 83 input voltage control. This compensation will not be necessary if an alternative adjustment mechanism is used, whereby the first mirror 128 will be translated out of the optical path altogether when the longer optical path of FIG. 7 is used.

Tabletop Projector

Figure 8:
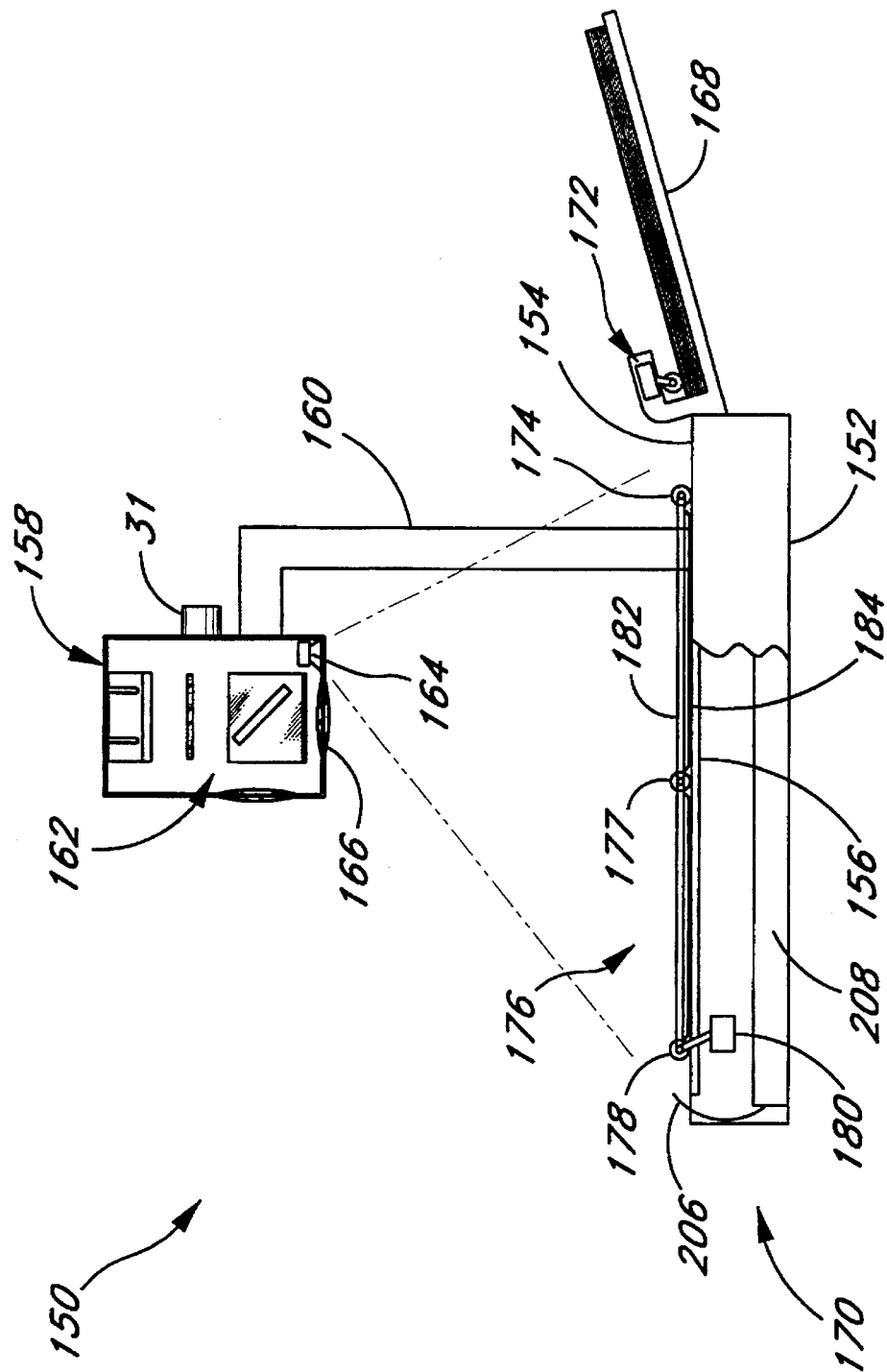
FIG. 8 is a side elevational view of an alternative tabletop version of the overhead projector of the present invention.

FIG. 8 illustrates an alternative version of the present invention wherein a projection system 150 incorporates many of the inventive features described above in a more lightweight, portable apparatus. The projection system 150 includes a body 152 having a table 154 with a mirror 156 mounted thereon and defining a projection location. An optical projection head 158 supported by a stand 160 includes substantially identical optical components 162 as was described with reference to FIGS. 4 through 7. Additionally, the head 158 includes a light source 164 for illuminating transparencies placed on the mirror 156. The mirror 156 is preferably a Fresnel mirror which reflects the illuminated image of the transparency upward to focus on a lower lens 166 of the projector head 158. Placing the light source 164 in the projector head 158 substantially reduces the bulk of the body 152 as compared to the body 26 in the first embodiment.

The tabletop projector system further includes a feed path extending from an input tray 168 across the table 154 to an output tray 170. In this version, the path of transparencies can only go in one direction from the input tray 168 to the output tray 170. The input tray 168 mounted substantially at the level of the table 154 includes a roller mechanism 172 for propelling a top sheet of a stack of transparencies onto the table 154 to be grabbed by a first roller 174 of a table feed mechanism 176. The table feed mechanism incorporates second and third rollers, 177 and 178, respectively, as well as a drive motor 180 and coupling belt 182. The table feed mechanism 176 is similar to that shown in FIG. 1 which provides rollers on either side of the transparency for frictional engagement along those edges. Also as in the first embodiment, the table feed mechanism 176 includes hold-down strips 184 for maintaining the transparency flat on the mirror 156.

The output tray 170 of FIG. 8 incorporates a transparency flipping mechanism. The rollers 174, 176, 178 propel transparencies across the table 154 toward a curvilinear guide 206 in order to redirect the transparencies into a receptacle 208 located substantially beneath the table. The provision of the mechanism flips the transparencies over to eliminate the need to resort a stack of transparencies from first to last. This is important when a large number of transparencies are utilized for presentation and the presentation will be repeated at short intervals.

Although this invention has been described in terms of certain preferred embodiments, other embodiments that are apparent to those of ordinary skill in the art are also within the range of this invention. Accordingly, the scope of the invention is intended to be defined only by reference to the following claims.

We claim:

1. An apparatus for viewing transparencies, comprising:

a body defining a projection location;

a light source within said body for illuminating transparencies at said projection location;

a head support;

a projection optics head supported by said head support, said head comprising:

a housing defining a first aperture and a second aperture, said first aperture positioned relative said body such that a light beam emitted from said source and passing through a transparency at said projection location will pass through said first aperture;

a first lens mounted within said housing positioned so as to focus a light beam passing through said first aperture;

a first mirror mounted within said housing;

a second mirror mounted within said housing;

a third mirror mounted within said housing;

a mechanism for moving said first mirror from a first position to a second position, wherein when said first mirror is in said first position a light beam passing through said first lens is first reflected by said first mirror through said second aperture and when said first mirror is in said second position a light beam passing through said first lens is first reflected by said second mirror toward said third mirror, which subsequently reflects said light beam toward said first mirror which thereafter reflects said light beam through said second aperture.

2. The apparatus of claim 1, wherein said optical head further comprises a second lens mounted within said housing positioned such that light passes through said second lens only when said first mirror is in said second position, said second lens compensating for any difference in distance light travels within said head between when said first mirror is in said first position and when said first mirror is in said second position.

3. The apparatus of claim 2, further comprising a second lens mounted within said housing positioned so as to focus any light beam reflected by said first mirror through said second aperture upon a viewing surface.

4. The apparatus of claim 3, further comprising a control for adjusting the focus of light on a viewing surface.

5. An apparatus for viewing transparencies, comprising:

a body defining a projection location;

a light source within said body for illuminating transparencies at said projection location;

a head support;

a projection optics head supported by said head support, said head comprising:

a housing defining a first aperture and a second aperture, said first aperture positioned relative said body such that a light beam emitted from said source and passing through a transparency at said projection location will pass through said first aperture;

a first lens mounted within said housing positioned so as to focus a light beam passing through said first aperture;

a first mirror mounted within said housing capable of reflecting said focused light beam through said second aperture; and a transparency changer, comprising:

an input tray sized and shaped to hold transparencies prior to viewing;

an output tray sized and shaped to hold transparencies after viewing;

a feeder for transporting transparencies in a predetermined orientation relative one another from said input tray to said projection location and from said projection location to said output tray without altering said predetermined orientation, said feeder comprising a plurality of guide members shaped such that said guide members invert transparencies between said input tray and said output tray.

6. An apparatus for viewing transparencies, comprising:

a body defining a projection location;

a light source within said body for illuminating transparencies at said projection location;

a head support;

a projection optics head supported by said head support, said head comprising:

a housing defining a first aperture and a second aperture, said first aperture positioned relative said body such that a light beam emitted from said source and passing through a transparency at said projection location will pass through said first aperture;

a first lens mounted within said housing positioned so as to focus a light beam passing through said first aperture;

a first mirror mounted within said housing capable of reflecting said focused light beam through said second aperture; and a transparency changer, comprising:

an input tray sized and shaped to hold transparencies prior to viewing;

an output tray sized and shaped to hold transparencies after viewing;

a feeder for transporting transparencies from said input tray to said projection location and from said projection location to said output tray a second mirror mounted within said housing;

a third mirror mounted within said housing; and a mechanism for moving said first mirror from a first position to a second position, wherein when said first mirror is in said first position a light beam passing through said first lens is first reflected by said first mirror through said second aperture and when said first mirror is in said second position a light beam passing through said first lens is first reflected by said second mirror toward said third mirror, which subsequently reflects said light beam toward said first mirror which thereafter reflects said light beam through said second aperture.

7. An apparatus for view transparencies, comprising:

a body defining a projection location;

a head support;

a projection optics head supported by said head support;

a light source within one of said body and said head for illuminating transparencies at said projection location, wherein said head comprises a mechanism for projecting an image of a transparency in said projection location upon a surface in a first orientation and upon said surface in a second orientation, wherein said first orientation is orthogonal to said second orientation.

8. the apparatus of claim 7, further comprising:

an input tray sized and shaped to hold transparencies prior to viewing;

an output tray sized and shaped to hold transparencies after viewing;

a feeder for transporting transparencies in a predetermined orientation relative one another from said input tray to said projection location and from said projection location to said output tray without altering said predetermined orientation.

9. The apparatus of claim 8, wherein said feeder is also capable of transporting transparencies from said output tray to said projection location and from said projection location to said input tray.

10. An apparatus for view transparencies, comprising:

a body defining a projection location;

a head support;

a projection optics head supported by said head support;

a light source within one of said body and said head for illuminating transparencies at said projection location, wherein said head comprises a mechanism for projecting an image of a transparency in said projection location upon a surface in a first orientation and a second orientation, wherein said first orientation is orthogonal to said second orientation;

an input tray sized and shaped to hold transparencies prior to viewing;

an output tray sized and shaped to hold transparencies after viewing;

a feeder for transporting transparencies from said input tray to said projection location and from said projection location to said output tray, wherein said feeder is also capable of transporting transparencies from said output tray to said projection location and from said projection location to said input tray; and an override tray, wherein said feeder is capable of transporting transparencies from said override tray to said projection location.

11. An apparatus for view transparencies, comprising:

a body defining a projection location;

a head support;

a projection optics head supported by said head support;

a light source within one of said body and said head for illuminating transparencies at said projection location;

an input tray sized and shaped to hold transparencies prior to viewing;

an output tray sized and shaped to hold transparencies after viewing;

a feeder defining a feed path from said input tray to said projection location and from said projection location to said output tray, comprising;

a plurality of engagement members arranged along said feed path so as to frictionally engage transparencies being transported along said feed path;

a plurality of guide members positioned along said feed path and shaped such that said guide members invert transparencies between said input tray and said output tray so that said transparencies have an identical orientation relative one another in said input tray and said output tray; and a drive system selectively moving said engagement members so that transparencies frictionally engaged by said engagement members are moved along said feed path from said input tray to said projection location and from said projection location to said output tray; and a control unit communicating with said feeder, wherein by manipulating said control unit an operator can control said feeder.

12. The apparatus of claim 11, wherein said drive system is further capable of selectively moving said engagement members such that transparencies frictionally engaged by said engagement members are moved along said feed path from said output tray to said projection location and from said projection location to said input tray.

13. The apparatus of claim 12, further comprising a mechanism for projecting an image of a transparency in said projection location upon a surface in a first orientation and a second orientation, wherein said first orientation is orthogonal to said second orientation.

14. An apparatus for viewing transparencies, comprising:
a body defining a projection location;
a head support;
a projection optics head supported by said head support;
a light source within one of said body and said head for illuminating transparencies at said projection location;
an input tray sized and shaped to hold transparencies prior to viewing;
an output tray sized and shaped to hold transparencies after viewing;
a feeder defining a feed path from said input tray to said projection location and from said projection location to said output tray, comprising;
a plurality of engagement members arranged along said feed path so as to frictionally engage transparencies being transported along said feed path; and
a drive system selectively moving said engagement members so that transparencies frictionally engaged by said engagement members are moves along said feed path from said input tray to said projection location and from said projection location to said output tray; and
a control unit communicating with said feeder, wherein by manipulating said control unit an operator can control said feeder, wherein said drive system is further capable of selectively moving said engagement members such that transparencies frictionally engaged by said engagement members are moved along said feed path from said output tray to said projection location and from said projection location to said input tray; and
an override tray, wherein said feeder is capable of transporting transparencies from said override tray to said projection location.

15. The apparatus of claim 14, further comprising a mechanism for projecting an image of a transparency in said projection location upon a surface in a first orientation and upon said surface in a second orientation, wherein said first orientation is orthogonal to said second orientation.

16. An apparatus for viewing transparencies, comprising:
a body defining a projection location;
a head support;
a projection optics head supported by said head support, said head comprising:
a housing defining a first aperture and a second aperture, said first aperture positioned relative said body such that a light beam emitted from said source and passing through a transparency at said projection location will pass through said first aperture;
a light source mounted within said housing for illuminating transparencies at said projection location;
a first lens mounted within said housing positioned so as to focus a light beam passing through said first aperture;
a first mirror mounted within said housing;
a second mirror mounted within said housing;
a third mirror mounted within said housing;
a mechanism for moving said first mirror from a first position to a second position, wherein when said first mirror is in said first position a light beam passing through said first lens is first reflected by said first mirror through said second aperture and when said first mirror is in said second position a light beam passing through said first lens is first reflected by said second mirror toward said third mirror, which subsequently reflects said light beam toward said first mirror which thereafter reflects said light beam through said second aperture.

17. The apparatus of claim 16, wherein said optical head further comprises a second lens mounted within said housing positioned such that light passes through said second lens only when said first mirror is in said second position, said second lens compensating for any difference in distance light travels within said head between when said first mirror is in said first position and when said first mirror is in said second position.

18. The apparatus of claim 17, further comprising a second lens mounted within said housing positioned so as to focus any light beam reflected by said first mirror through said second aperture upon a viewing surface.

19. The apparatus of claim 18, further comprising a control for adjusting the focus of light on a viewing surface.

20. An apparatus for viewing transparencies, comprising:
a body defining a projection location;
a head support;
a projection optics head supported by said head support, said head comprising:
a housing defining a first aperture and a second aperture, said first aperture positioned relative said body such that a light beam emitted from said source and passing through a transparency at said projection location will pass through said first aperture;
a light source mounted within said housing for illuminating transparencies at said projection location;
a first lens mounted within said housing positioned so as to focus a light beam passing through said first aperture;
a first mirror mounted within said housing capable of reflecting said focused light beam through said second aperture; and
a transparency changer, comprising:
an input tray sized and shaped to hold transparencies prior to viewing;
an output tray sized and shaped to hold transparencies after viewing;
a feeder for transporting transparencies from said input tray to said projection location and from said projection location to said output tray; and
a plurality of guide members between said input tray and said output tray shaped and positioned such that said guide members invert transparencies moving between said input tray and said output tray so that transparencies moved from said input tray to said output tray have an identical orientation relative one another in said input tray and said output tray.

21. An apparatus for viewing transparencies, comprising:
a body defining a projection location;
a head support;
a projection optics head supported by said head support, said head comprising:

a housing defining a first aperture and a second aperture, said first aperture positioned relative said body such that a light beam emitted form said source and passing through a transparency at said projection location will pass through said first aperture;

a light source mounted within said housing for illuminating transparencies at said projection location;

a first lens mounted within said housing positioned so as to focus a light beam passing through said first aperture;

a first mirror mounted within said housing capable of reflecting said focused light beam through said second aperture; and a transparency changer, comprising:

an input tray sized and shaped to hold transparencies prior to viewing;

an output tray sized and shaped to hold transparencies after viewing;

a feeder for transporting transparencies from said input tray to said projection location and from said projection location to said output tray;

a second mirror mounted within said housing;

a third mirror mounted within said housing; and a mechanism for moving said first mirror from a first position to a second position, wherein when said first mirror is in said first position a light beam passing through said first lens is first reflected by said first mirror through said second aperture and when said first mirror is in said second position a light beam passing through said first lens is first reflected by said second mirror toward said third mirror, which subsequently reflects said light beam toward said first mirror which thereafter reflects said light beam through said second aperture.

* * * * *

UNITED STATES PATENT AND TRADEMARK OFFICE
CERTIFICATE OF CORRECTION

PATENT NO. : 5,467,152
DATED : November 14, 1995
INVENTOR(S) : Wilson, et al.

It is certified that error appears in the above-indentified patent and that said Letters Patent is hereby corrected as shown below:

Claim 7, Column 13, Line 51, please replace "for view" with --for viewing--;

Claim 10, Column 14, Line 10, please replace "for view" with --for viewing--;

Claim 11, Column 14, Line 36, please replace "for review" with --for viewing--;

Claim 11, Column 14, Line 49, please replace "comprising;" with --comprising:--;

Claim 14, Column 15, Line 25, please replace "comprising;" with --comprising:--;

Claim 21, Column 17, Line 3, please replace "emitted form said" with --emitted from said--;

Signed and Sealed this

Sixth Day of May, 1997

Attest:

BRUCE LEHMAN

*Attesting Officer*        *Commissioner of Patents and Trademarks*